(12) United States Patent
King

(10) Patent No.: US 7,334,612 B1
(45) Date of Patent: Feb. 26, 2008

(54) LOG GRIPPING ATTACHMENT FOR A TREE GRINDER APPARATUS

(76) Inventor: Thomas P King, 26855 Airport Rd., Punta Gorda, FL (US) 33980

( * ) Notice: Subject to any disclaimer, the term of this patent is extended or adjusted under 35 U.S.C. 154(b) by 49 days.

(21) Appl. No.: 11/232,282

(22) Filed: Sep. 21, 2005

(51) Int. Cl.
*A01G 23/00* (2006.01)
(52) U.S. Cl. ........................ 144/4.1; 144/34.1
(58) Field of Classification Search ............ 144/4.1, 144/34.1, 24.12, 3.1, 1.1, 334–337; 241/101.71, 241/101.72, 101.74; 37/301, 302; 56/10.1, 56/11.9, 10.6–10.8, 13.5
See application file for complete search history.

(56) References Cited

U.S. PATENT DOCUMENTS

| | | | | |
|---|---|---|---|---|
| 3,140,736 A | * | 7/1964 | Propst | 144/4.1 |
| 3,651,845 A | * | 3/1972 | Propst | 144/4.1 |
| 3,707,175 A | * | 12/1972 | Propst | 144/338 |
| 4,911,215 A | * | 3/1990 | Phipps | 144/337 |
| 5,086,684 A | * | 2/1992 | Johnson | 83/795 |
| RE33,840 E | * | 3/1992 | Peterson et al. | 144/208.7 |
| 5,797,438 A | * | 8/1998 | Dye | 144/246.1 |
| 6,408,906 B1 | * | 6/2002 | Moon et al. | 144/24.13 |
| 6,488,063 B2 | * | 12/2002 | Seymour | 144/338 |

* cited by examiner

*Primary Examiner*—Shelley M. Self
(74) *Attorney, Agent, or Firm*—William E. Noonan

(57) ABSTRACT

A log gripping attachment for a tree grinder includes a first thumb or jaw section pivotally mounted to the support frame of the grinder. There is a complementary second jaw section carried by the support frame and pivotally opposing the first jaw section. A drive mechanism selectively pivots the first jaw section open relative to the second jaw section such that a log may be received between the first and second jaw sections. The jaw driving mechanism may be alternately operated to pivot the first jaw section closed relative to the second jaw section. As a result, a log between the first and second jaw sections is gripped by the opposing jaw sections.

12 Claims, 5 Drawing Sheets

LOG GRIPPING ATTACHMENT FOR A TREE GRINDER APPARATUS

FIELD OF THE INVENTION

This invention relates to a log gripping attachment for a tree grinder apparatus and, more particularly, to an attachment featuring a pivoting thumb or jaw that enables longer logs and merchantable wood to be conveniently and efficiently retrieved and set aside while stumps, shorter logs and other disposable vegetation are mulched by the grinder apparatus.

BACKGROUND OF THE INVENTION

It is often necessary to remove unwanted, unnecessary and/or interfering trees, stumps and vegetation from areas such as to the land adjacent to a public highway, a public utility right-of-way, agriculture land and forested land that must be cleared. Various machines are available to perform this task. See U.S. Pat. Nos. 5,992,483 and 5,823,238. Typically, these machines grind and mulch stumps, brush and logs up to a certain size, i.e. 8" in length. The mulched wood can then be used in an environmentally friendly manner to either fill holes or scatter about the surrounding ground.

The known machines do not adequately address the problems presented by larger stumps and longer sections of trees (i.e. those greater than 8" in length). Much of this material still has to be hauled away for burning or other disposal. Additionally, in many cases, longer lengths of wood have commercial value and can be transported to a wood processing facility. In either case, a significant amount of the wood that is cut is not suitable for mulching and therefore has to be picked up after it is cut, piled out of the way of the tree clearing operation and eventually transported from the site. Even limbs or smaller pieces that are eventually mulched often first must be retrieved from the immediate area being cleared before the mulching operation occurs.

Conventional tree grinding machines do not adequately retrieve, manipulate and pile fallen trees and limbs. Typically, a second machine, which may comprise a loader with a grapple mechanism, is employed to move the fallen trees that the grinder cannot mulch immediately. This tends to make the tree clearing operation inefficient, costly and time consuming. Added manpower and equipment costs can be substantial. If a machine breaks down or malfunctions, costly delays can result. Known stump grinders and tree clearing equipment do not adequately address these costs and inefficiencies.

SUMMARY OF THE INVENTION

It is therefore an object of the present invention to provide a log gripping attachment for a tree grinder, which allows both mulching and tree removal operations to be performed in an efficient and cost effective manner by the same machine.

It is a further object of this invention to provide for a machine that allows significantly improved versatility in the forestry and tree clearing industries and which particularly allows the operator of the machine to either mulch material if appropriate or alternatively to collect and pile that material for later removal.

It is a further object of this invention to provide a log gripping attachment for a tree grinder that permits commercially valuable wood to be effectively and efficiently retrieved and piled for subsequent transport and processing.

It is a further object of this invention to provide a log gripping attachment that improves the efficiency and versatility of existing tree grinding and mulching machines considerably.

It is a further object of this invention to provide a log gripping attachment for a tree grinder that reduces the need for extra loading or retrieval machines and accompanying manpower in a tree removal operation.

This invention features a gripping attachment for a tree grinder. The grinder includes a cutting mechanism, a support frame for operatively mounting the mechanism to a vehicle movable between selected locations and a drive and positioning assembly carried by the vehicle for selectively positioning the support frame and operating the cutting mechanism to grind one or more trees. The log gripping attachment includes a first thumb or jaw section pivotally mounted to the support frame. There is a complementary second jaw section carried by the frame and pivotally opposing the first jaw section. A jaw driving mechanism is operated to selectively pivot the first jaw section open relative to the second jaw section such that a log is receivable between the first and second jaw sections. The drive mechanism also selectively pivots the first jaw section closed relative to the second jaw section to grip the received log between the first and second jaw sections.

In a preferred embodiment, the second jaw section is fixedly attached to a side wall of the frame. The first jaw section may extend generally downwardly across and outwardly from the side wall with the first jaw section opposing the second jaw section. The first and second jaw sections may include opposing teeth for gripping a received log therebetween when the first and second jaw sections are in a closed condition. The first jaw section may have a generally concave profile for at least partly wrapping about a log received between the first and second jaw sections when the jaw sections are in a closed condition. The second jaw section may include at least one tine component that is attached to and extends from a lower portion of the frame for at least partly wrapping about a log received between the jaw sections when the jaw sections are closed.

The drive mechanism may include a hydraulic drive unit. The hydraulic drive unit may include a hydraulic cylinder pivotally interconnected at one end to a mounting bracket mounted on the frame and at an opposite second end to a mounting bracket attached to the first jaw section.

DETAILED DESCRIPTION OF PREFERRED EMBODIMENTS

Other objects, features and advantages will occur from the following description of a preferred embodiment and the accompanying drawings, in which.

Figure 1:
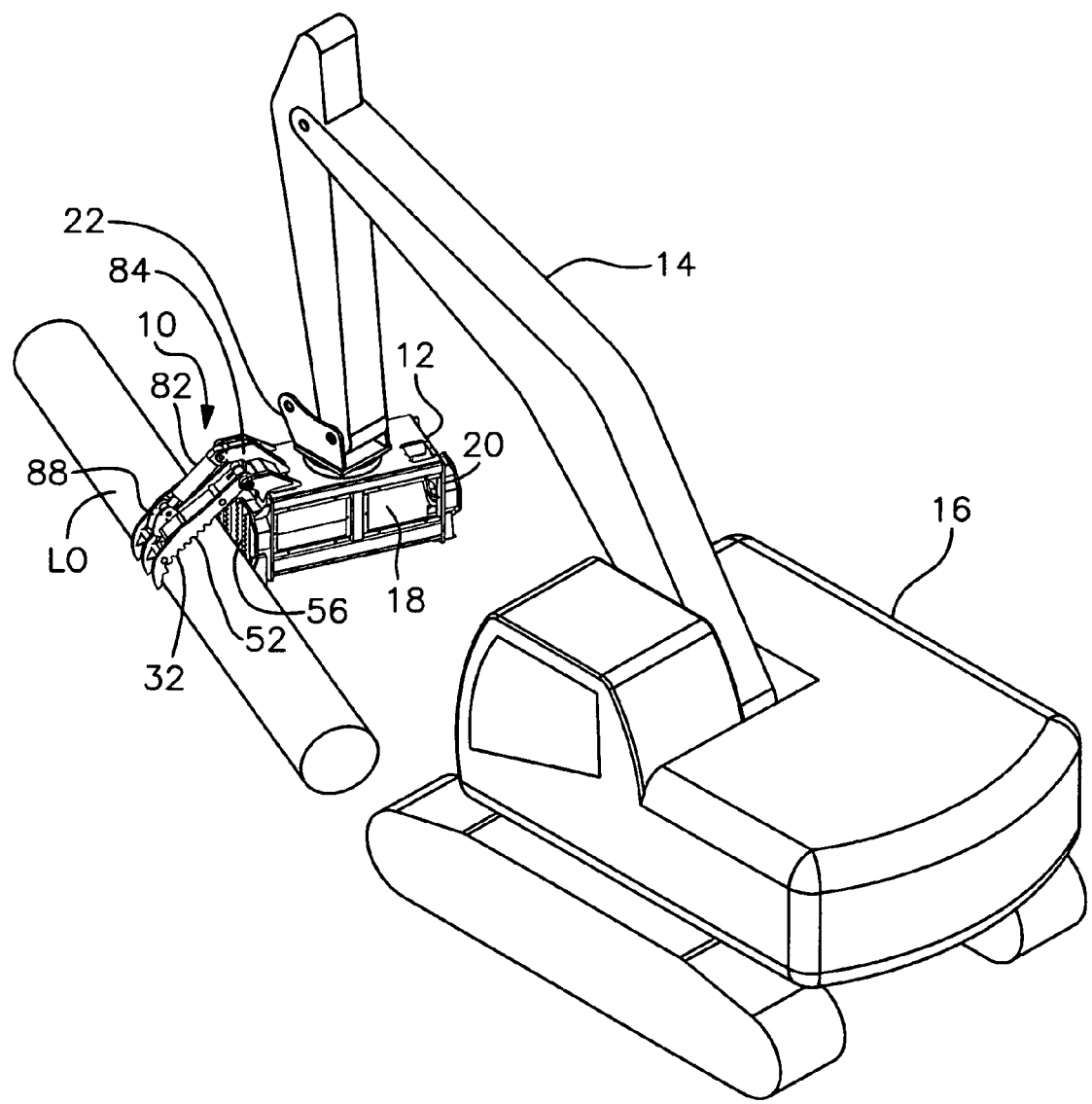
FIG. 1 is a perspective view of a backhoe grinder machine employing a log gripping attachment in accordance with this invention.
Figure 2:
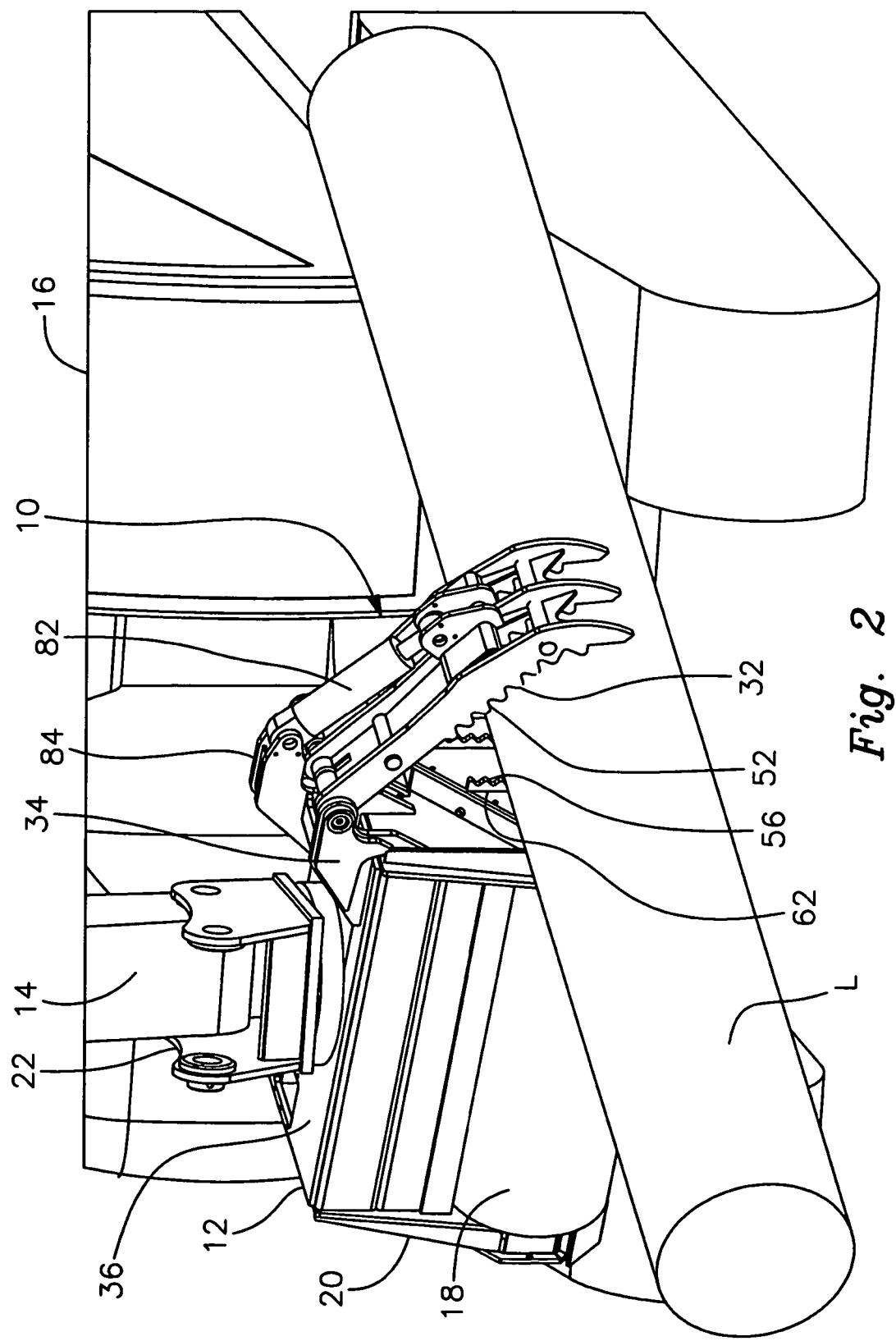
FIG. 2 is a front perspective view of the machine with the log gripping attachment holding a log that is being retrieved and/or repositioned in a stack or pile.

There is shown in FIGS. 1 and 2 a log gripping attachment 10 that is mounted to an otherwise standard tree grinder 12. The tree grinder is itself operatively carried by the boom 14 of a backhoe, tractor or other vehicle 16. It should be understood that vehicle 16, boom 14 and grinder 12 are known and commercially available components, which are described, for example, in U.S. Pat. Nos. 5,992,483 and 5,823,238. It should be understood that attachment 10 may be used in conjunction various known types of tree and stump grinding machines in accordance with this invention. Persons skilled in the art will appreciate how such grinding machines and associated structure are assembled and operated.

More particularly, grinder 12 includes a cutting or mulching drum 18 that is mounted axially rotatably within a housing or support frame 20. The housing is itself mounted by means of a swivel bracket 22 to the distal end of boom 14. A representative swivel and connecting mechanism are specifically depicted in U.S. Pat. No. 5,992,482. The details of that structure are incorporated herein by reference. Vehicle 16 is driven by an operator to a selected tree clearing location. The operator employs controls located within the cab of the vehicle to operate the grinder mechanism 12 in a known fashion. Stumps, limbs, trees and brush are shredded as required. In particular, boom 14 is directed by the operator controls to position cutting mechanism 12 as needed. A conventional hydraulic cylinder and linkage, not shown, pivot the grinder about a horizontal axis, whereas the swivel bracket allows the grinder to pivot around a vertical axis. The boom thereby acts to raise and lower the grinder as needed to access and mulch trees, limbs, etc.

Figure 3:
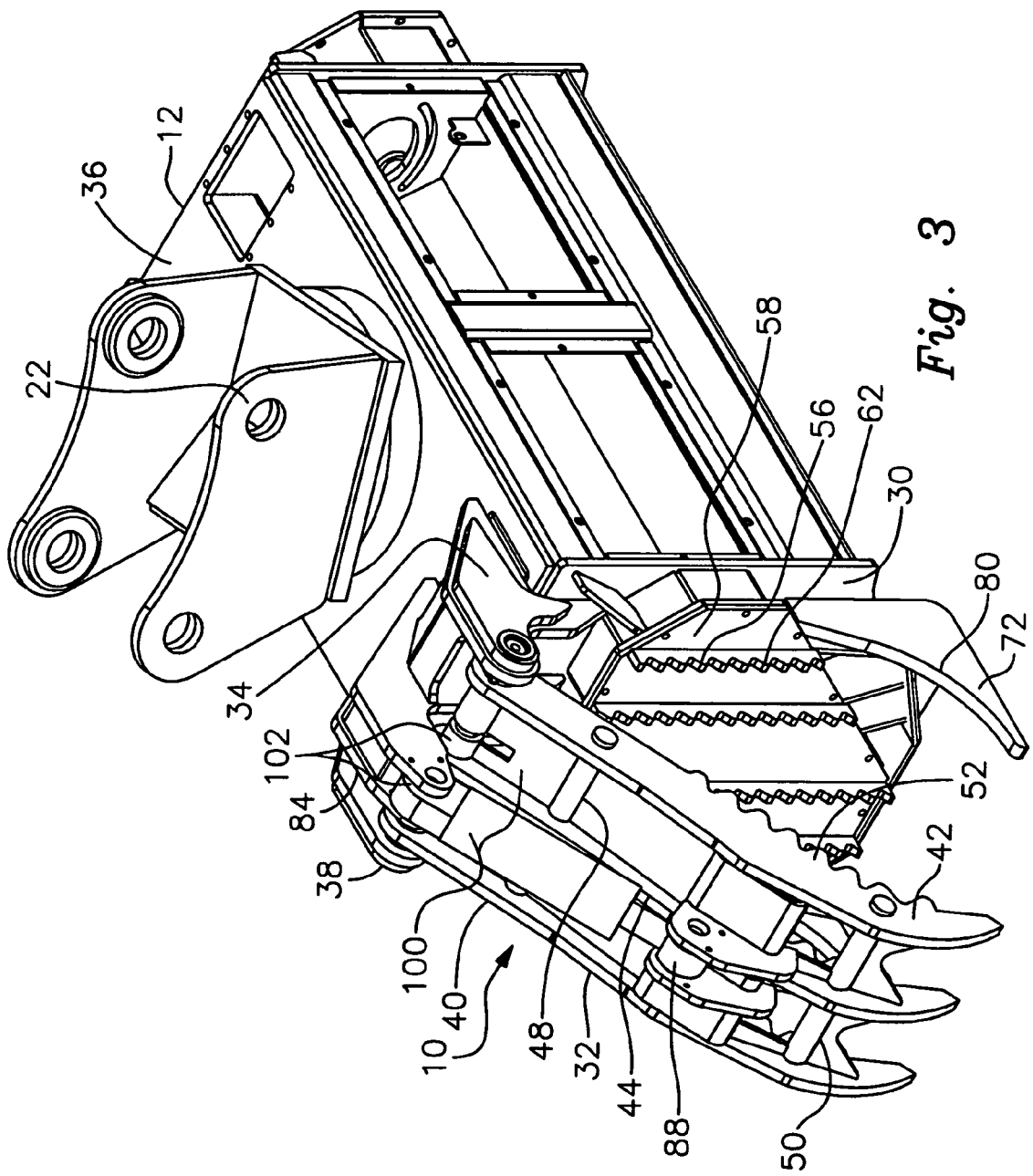
FIG. 3 is a front perspective view of a conventional grinder with the log gripping attachment of this invention mounted thereon; the hydraulic drive of the log gripping attachment is omitted for clarity.
Figure 4:
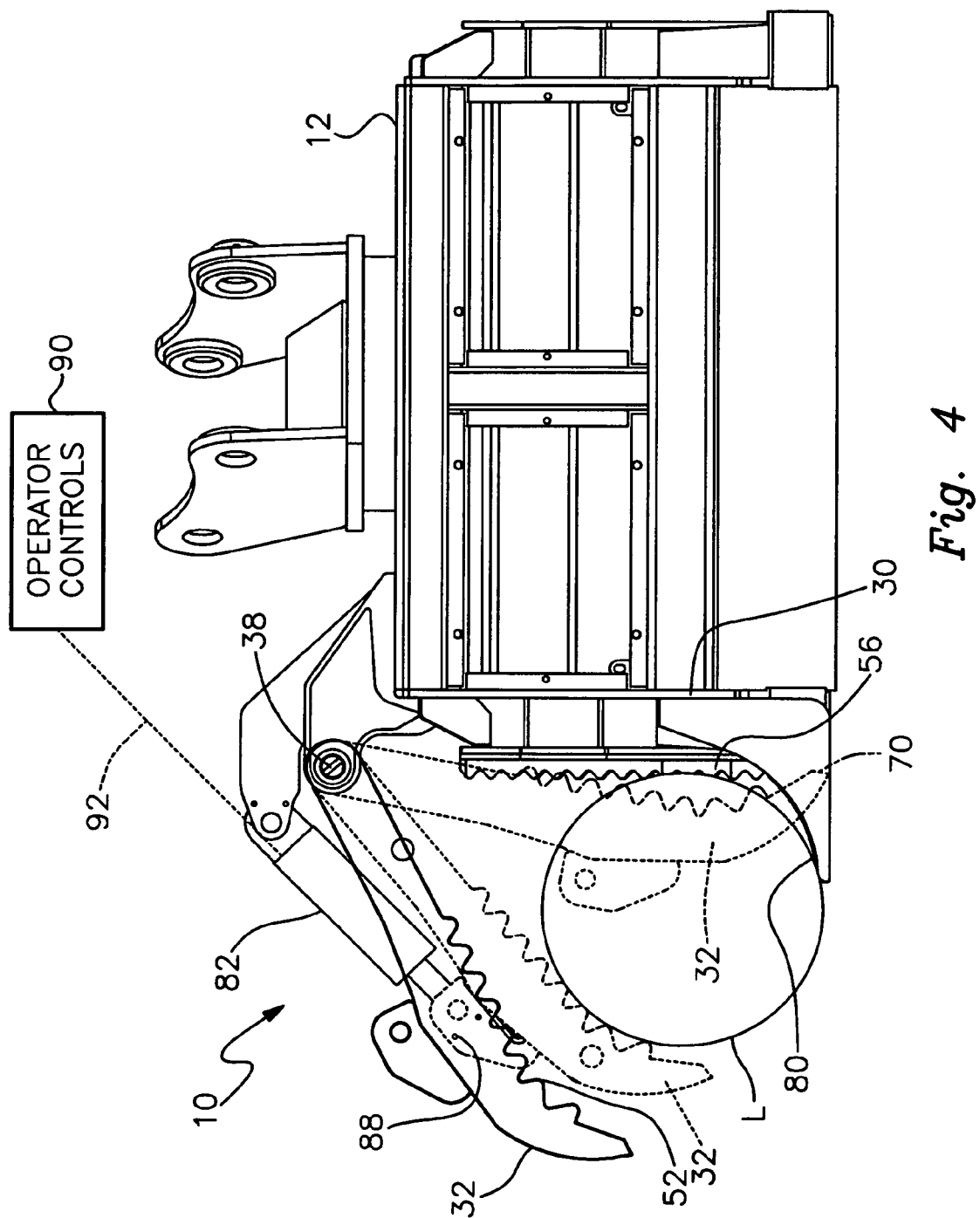
FIG. 4 is a side elevational and partly schematic view of the grinder and log gripping attachment, which depicts the first jaw in various pivotally positions.
Figure 5:
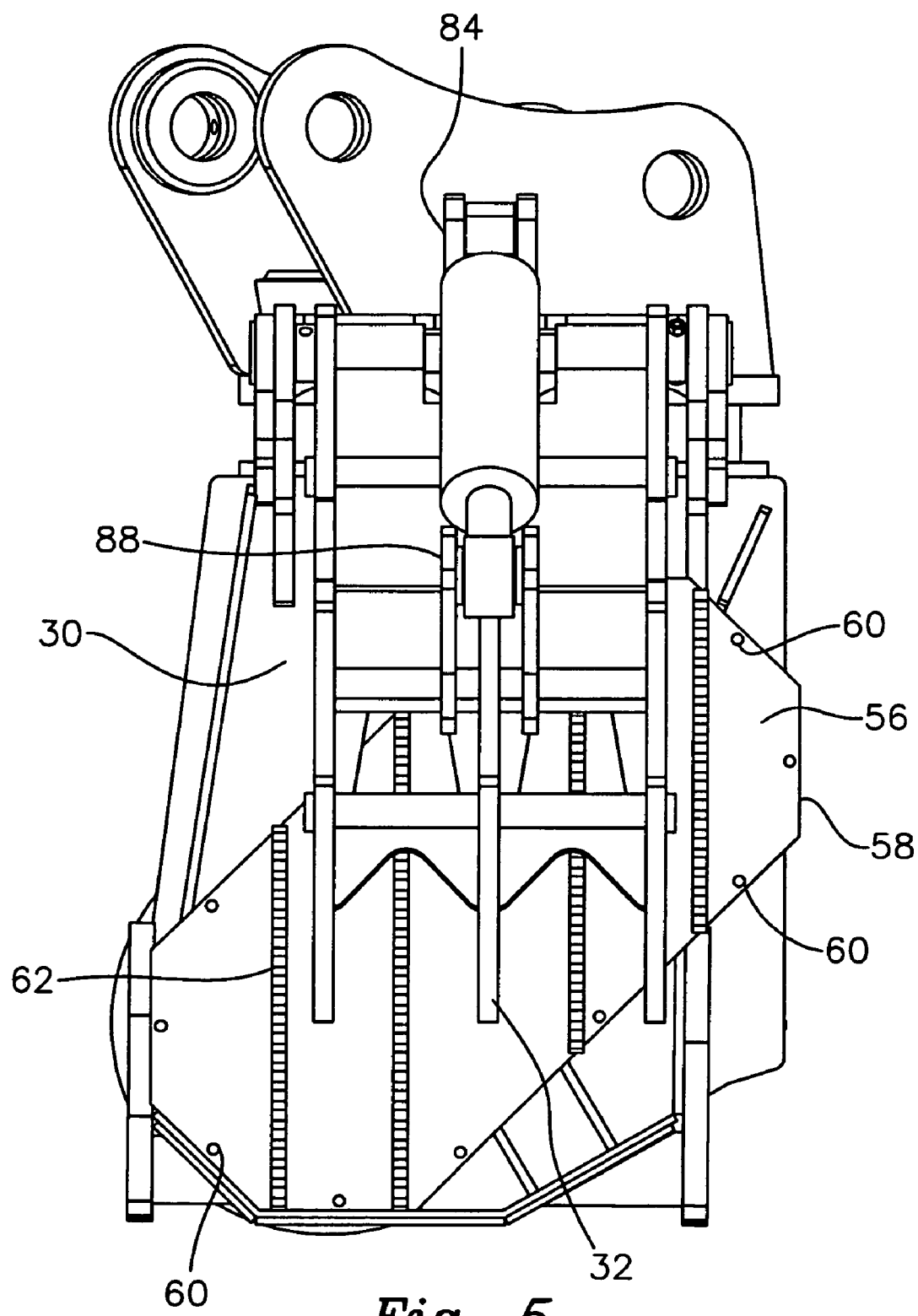
FIG. 5 is a front elevational view of the log gripping attachment and the side of the grinder machine to which it is attached; the hydraulic drive is again omitted for clarity.

Grinder 12 includes a vertical side wall 30, best shown in FIGS. 3-5. Log gripping attachment 10 is mounted to grinder 12 such that attachment 10 extends generally downwardly across and outwardly from side wall 30. More particularly, attachment 10 includes a pair of pivotally attached jaws that are operated to open and closed relative to one another. A first jaw section 32 comprising a pivoting thumb is hingedly secured to a pair of spaced apart mounting brackets 34 that are themselves fixed to the upper surface 36 and side wall 30 of grinder 12. A pin 38 extends through aligned holes in the parallel, spaced apart brackets 34, and arms 40, 42 and 44 of jaw section 32. Components 40, 42 and 44 have similar, generally concave profiles. Similarly, an intermediate rod 48 and a lower rod 50, FIG. 3, interconnect the elongate concave components of jaw section 12. As shown in FIGS. 1-4, each of the concave components 40, 42 and 44 includes a longitudinal series of teeth 52 formed along its inner edge.

As shown in FIGS. 1-5, a complementary second gripping jaw section 56 is fixedly attached to side wall 30 of grinder 12. Gripping section 56 comprises a plate 58, FIG. 5, that is secured to wall 30 by means such as bolts 60. The plate carries multiple series of vertically oriented teeth 62 that generally oppose teeth 52 of first jaw section 32. Typically, teeth 62 are not perfectly aligned with teeth 52, but rather are offset so that when the jaws of the gripping attachment are closed, the device securely grips logs L, FIGS. 1 and 2, that are carried by the device.

The second jaw section 56 also includes a pair of lower tine components 70 and 72 that are attached to and generally hang from a lower portion of side wall 30. See FIG. 4. In some versions, the tine components are attached and depend from plate 58 of engagement section 56. In each case, the tine component includes a curved front edge 80 that is engagable with a log being manipulated in the manner shown in FIG. 4 and described more fully below.

The log gripping mechanism 10 is operated by opening and closed outer jaw section 32 relative to inner jaw section 56. More particularly, the jaw sections are pivotally operated by a hydraulic drive unit comprising a hydraulic cylinder 82, FIGS. 1, 2 and 4. The hydraulic cylinder includes an upper end that is pivotally mounted to a conventional cylinder mounting yoke 84. More particularly, the upper end of cylinder 82 includes a mounting flange having an opening that aligns with the holes in yoke 84. A pivot pin interconnects the mounting flange and therefore the cylinder to the yoke. The opposite end of the cylinder comprises a piston rod that is pivotally secured at its distal end to a lower mounting yoke 88 attached to jaw section 32.

Operator controls 90, FIG. 3, provide hydraulic fluid through line 92, which operates cylinder 82 to selectively pivot jaw section 32 open or closed with respect to jaw section 56. More particularly, when the piston rod of cylinder 82 is retracted, the cylinder is driven into a generally vertical condition, which opens the jaws of the gripping attachment. Alternatively, when the rod is driven outwardly from the cylinder 82, the cylinder pivots into the generally vertical condition shown in FIG. 3 and the jaws are closed such that they interengage a log L positioned between the jaws. As shown in FIG. 3, a pair of leaf springs 100 and leaf spring retainers 102 may be mounted within jaw section 32 such that the jaw section is urged or biased into a closed condition. This helps the jaws to close and prevents the jaws from inadvertently opening as the tree grinder is being maneuvered.

In operation, vehicle 16, FIG. 1, is maneuvered into a selected position. If the operator desires to mulch a stump, limb, log, etc., the grinder is maneuvered into position and the mulching task is performed. Alternatively, if the operator desires to retrieve or reposition a log so that the log can be later transported, mulched or moved, he positions the grinder 12 proximate the log through appropriate operation of the boom and standard grinder controls located in the cab. The operator then operates controls 90, FIG. 4, such that the cylinder 82 retracts and opens jaw section 32 wide relative to jaw section 56 (i.e. the most open position shown in FIG. 4). The jaw sections are positioned around log L. The operator then actuates the controls to extend the cylinder and close jaw 32 relative to jaw section 56. The jaw sections close around the log as depicted in FIGS. 1, 2 and 4. Specifically, the elongate concave pieces 40, 42, 44 of jaw section 56 wrap at least partly around the log; similarly, the tine components 70 and 72 wrap around another part of the circumference of the log. At the same time, generally opposing teeth 52 and 62 of jaw sections 32 and 56 respectively bear against the circumference of the log. As a result, the log is held tightly between the closed jaws (e.g. gripped or clamped). The grinder and log gripping attachment may then be manipulated through operation of boom 14 to reorient and replace the log in a desired pile or location. A number of logs and long pieces of wood may be moved quickly and efficiently in this manner utilizing only a single machine rather than multiple machines as required by the prior art. Manpower and equipment costs are reduced. Machine breakdowns and resulting delays are also lessened. The tree removal process is performed far more efficiently.

It should be understood that the log gripping machine may be varied in a number of ways within the scope of the invention. As previously indicated, various types of standard grinding machines may be employed. The gripping jaws may be attached to the grinder by welding, bolts and other known means of attachment. Various alternative arrangements of elongate, concave jaw components and opposing gripping elements may be utilized. Numbers, shapes and arrangement of the teeth may be varied within the scope of the invention. The opposing concave shapes on the tines and elongate elements of the first jaw section may be varied although it is preferred that the opposing jaw sections wrap at least partly about the logs to provide for secure and reliable lifting. The secure grip reduces the chance that the logs will be dropped as they are maneuvered. This saves time and expense.

It should also be understood that various alternative means may be employed for driving the jaw sections open and closed. Pneumatic cylinders, electric motors and other means of operation may be utilized.

The components should be manufactured from durable and rugged metals and metal alloys similar to other components used in the forestry and tree grinding industries.

From the foregoing it may be seen that the apparatus of this invention provides for a log gripping attachment for a tree grinder apparatus and, more particularly, to an attachment featuring a pivoting thumb or jaw that enables longer logs and merchantable wood to be conveniently and efficiently retrieved and set aside while stumps, shorter logs and other disposable vegetation is mulched by the grinder apparatus. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following

What is claimed is:

1. A tree grinder apparatus comprising:
a cutting mechanism;
a support frame for operatively mounting said cutting mechanism to a vehicle movable between selected locations;
a drive and positioning assembly carried by the vehicle for selectively positioning said support frame and operating said cutting mechanism to grind one or more trees;
hingedly interconnected and opposed first and second jaw sections carried by said support frame for pivoting about a single, common pivot axis between open and closed positions; said second jaw section being fixedly attached to a side wall of said support frame, said cutting mechanism including a cutter drum mounted axially rotatably between said side wall and an opposing second side wall; and
a jaw driving mechanism for hingedly opening said first and second jaw sections relative to one another about said pivot axis such that a log is receivable between said first and second jaw sections and closing said first and second jaw sections relative to one another to grip a received log between said first and second jaw sections.

2. The apparatus of claim 1 in which said first and second jaw sections include opposing teeth for gripping a received log therebetween when said first and second jaw sections are in a closed condition.

3. The apparatus of claim 1 in which said drive mechanism includes a hydraulic drive unit.

4. The apparatus of claim 1 in which said first jaw section has a generally concave profile for wrapping at least partly around a log received between said first and second jaw sections when said jaw sections are in a closed condition.

5. The apparatus of claim 1 in which said first jaw section is extendable generally downwardly across and outwardly from the side wall of the support frame with said first jaw section opposing said second jaw section, such that said first and second jaw sections are supported by said support frame horizontally adjacent to said cutter mechanism.

6. The apparatus of claim 1 in which said first and second jaw sections are oriented on said support frame such that a log gripped between said jaw sections is not engagable with or cuttable by said cutting mechanism.

7. The apparatus of claim 1 in which said jaw driving mechanism operates said first jaw section exclusively to open and close said first jaw section relative to said second jaw section.

8. A tree grinder apparatus comprising:
a cutting mechanism;
a support frame for operatively mounting said cutting mechanism to a vehicle movable between selected locations;
a drive and positioning assembly carried by the vehicle for selectively positioning said support frame and operating said cutting mechanism to grind one or more trees;
said drive and positioning assembly including an elongate boom, said support frame and said cutting mechanism being attached to said boom for swiveling about a longitudinal axis of said boom;
a first jaw section hingedly mounted to said support frame;
a complementary second jaw section fixedly attached to said support frame, said first and second jaw sections being hingedly interconnected for pivoting in an opposed manner relative to one another about a single, common pivot axis between open and closed positions, said common pivot axis being generally perpendicular to the longitudinal axis of said boom; and
a jaw driving mechanism for selectively pivoting said first jaw section open relative to said second jaw section, such that a log is receivable between said first and second jaw sections, and closed relative to said second jaw section to grip a received log between said first and second jaw sections, said jaw sections being oriented on said support frame such that a log gripped between said jaw sections is not engagable with or cuttable by said cutting mechanism.

9. The apparatus of claim 8 in which said support frame includes a pair of spaced apart side walls with said cutting mechanism including an axially rotatable drum mounted between said side walls, said jaw sections being carried upon an exterior surface of one of said side walls and held horizontally adjacent said cutter mechanism.

10. A tree grinder apparatus comprising:
a cutting mechanism;
a support frame for operatively mounting said cutting mechanism to a vehicle movable between selected locations;

a drive and positioning assembly carried by the vehicle for selectively positioning said support frame and operating said cutting mechanism to grind one or more trees;

hingedly interconnected and opposed first and second jaw sections carried by said support frame for pivoting about a single, common pivot axis between open and closed positions; and a jaw driving mechanism for hingedly opening said first and second jaw sections relative to one another about said pivot axis such that a log is receivable between said first and second jaw sections and closing said first and second jaw sections relative to one another to grip a received log between said first and second jaw sections; said second jaw section including at least one concave tine component that is attachable to and extendable generally downwardly and outwardly from a lower portion of said support frame for at least partly wrapping about a log received between said first and second jaw sections when said jaw sections are in a closed condition relative to one another.

11. A tree grinder apparatus comprising:

a cutting mechanism;

a support frame for operatively mounting said cutting mechanism to a vehicle movable between selected locations;

a drive and positioning assembly carried by the vehicle for selectively positioning said support frame and operating said cutting mechanism to grind one or more trees;

hingedly interconnected and opposed first and second jaw sections carried by said support frame for pivoting about a single, common pivot axis between open and closed positions; and a jaw driving mechanism for hingedly opening said first and second jaw sections relative to one another about said pivot axis such that a log is receivable between said first and second jaw sections and closing said first and second jaw sections relative to one another to grip a received log between said first and second jaw sections; said drive mechanism including a hydraulic drive unit, said hydraulic drive unit including a hydraulic cylinder pivotally interconnected at one end to a mounting bracket, which mounting bracket is mountable on the support frame, and at an opposite second end to a lower mounting bracket, which lower mounting bracket is attached to said first jaw.

12. A tree grinder apparatus comprising:

a cutting mechanism;

a support frame for operatively mounting said cutting mechanism to a vehicle movable between selected locations;

a drive and positioning assembly carried by the vehicle for selectively positioning said support frame and operating said cutting mechanism to grind one or more trees;

hingedly interconnected and opposed first and second jaw sections carried by said support frame for pivoting about a single, common pivot axis between open and closed positions; and a jaw driving mechanism for hingedly opening said first and second jaw sections relative to one another about said pivot axis such that a log is receivable between said first and second jaw sections and closing said first and second jaw sections relative to one another to grip a received log between said first and second jaw sections; said drive and positioning assembly including an elongate boom to which said support frame is axially swivelably attached, said pivot axis of said first and second jaw sections being generally perpendicular to the swivel axis of said support frame, whereby a log gripped between said jaw sections is not engagable with or cuttable by said cutting mechanism.

* * * * *